(12) United States Patent
Tracht et al.

(10) Patent No.: US 7,357,412 B2
(45) Date of Patent: Apr. 15, 2008

(54) VEHICLE SEAT ASSEMBLY

(75) Inventors: Michael L. Tracht, Ingolstadt (DE); Richard G. Dierl, Sandersdoft (DE); Sebastian Uschold, Munich (DE)

(73) Assignee: Lear Corporation, Southfield, MI (US)

( * ) Notice: Subject to any disclaimer, the term of this patent is extended or adjusted under 35 U.S.C. 154(b) by 438 days.

(21) Appl. No.: 10/904,838

(22) Filed: Dec. 1, 2004

(65) Prior Publication Data

US 2006/0113753 A1    Jun. 1, 2006

(51) Int. Cl.
*B60R 21/16* (2006.01)

(52) U.S. Cl. .................................. 280/730.2; 280/728.3

(58) Field of Classification Search ............. 280/730.2, 280/728.2, 728.3, 743.1; 297/218.2, 218.3
See application file for complete search history.

(56) References Cited

U.S. PATENT DOCUMENTS

| | | | |
|---|---|---|---|
| 5,498,030 | A | 3/1996 | Hill et al. |
| 5,639,111 | A | 6/1997 | Spencer et al. |
| 5,678,853 | A | 10/1997 | Maly |
| 5,749,597 | A | 5/1998 | Saderholm |
| 5,762,363 | A | 6/1998 | Brown et al. |
| 5,779,262 | A | 7/1998 | Totani et al. |
| 5,810,389 | A | 9/1998 | Yamaji et al. |
| 5,816,610 | A | 10/1998 | Higashiura et al. |
| 5,860,673 | A | 1/1999 | Hasegawa et al. |
| 5,863,063 | A | 1/1999 | Harrell |
| 5,899,528 | A | 5/1999 | Rumpf et al. |
| 5,927,749 | A | 7/1999 | Homier et al. |
| 5,938,232 | A | 8/1999 | Kalandek et al. |
| 5,967,603 | A | 10/1999 | Genders et al. |
| 6,007,091 | A | 12/1999 | Westrich |
| 6,045,151 | A | 4/2000 | Wu |
| 6,237,934 | B1 | 5/2001 | Harrell et al. |
| 6,352,304 | B1 | 3/2002 | Sorgenfrei |
| 6,357,789 | B1 * | 3/2002 | Harada et al. ........... 280/730.2 |
| 6,386,577 | B1 * | 5/2002 | Kan et al. ................. 280/730.2 |
| 6,578,911 | B2 * | 6/2003 | Harada et al. ......... 297/216.13 |

(Continued)

FOREIGN PATENT DOCUMENTS

DE    203 19 605 U1    4/2004

(Continued)

OTHER PUBLICATIONS

U.S. Appl. No. 08/808,572, filed Feb. 28, 1997, Wu et al.

*Primary Examiner*—Paul N. Dickson
*Assistant Examiner*—Tiffany L. Webb
(74) *Attorney, Agent, or Firm*—Brooks Kushman P.C.

(57) ABSTRACT

A vehicle seat assembly includes a frame for mounting the seat assembly to a vehicle, a seat pad disposed proximate the frame, and a trim cover disposed over the seat pad. The trim cover includes a seam adjacent a side of the seat pad. A pad shield covers at least a portion of the seat pad, and protects it during deployment of an airbag disposed within the seat assembly. The pad shield includes a first portion disposed between the seat pad and a side of the trim cover such that a deployment path for the airbag is formed between the first portion of the pad shield and the side of the trim cover. The pad shield facilitates movement of the seat pad away from, and inhibits contact of the seat pad with, the deploying airbag, and also facilitates deployment of the airbag through the seam in the trim cover.

16 Claims, 2 Drawing Sheets

U.S. PATENT DOCUMENTS

| | | |
|---|---|---|
| 6,588,838 B1 | 7/2003 | Dick, Jr. et al. |
| 2002/0063452 A1* | 5/2002 | Harada et al. ......... 297/216.13 |
| 2004/0227335 A1 | 11/2004 | Acker et al. |
| 2005/0156412 A1* | 7/2005 | Panagos et al. .......... 280/730.2 |
| 2006/0066078 A1 | 3/2006 | Hofmann |
| 2006/0113752 A1 | 6/2006 | Tracht |
| 2006/0113754 A1 | 6/2006 | Tracht |
| 2006/0113763 A1 | 6/2006 | Tracht et al. |
| 2006/0113764 A1 | 6/2006 | Tracht |

FOREIGN PATENT DOCUMENTS

| | | |
|---|---|---|
| EP | 0 819 587 A1 | 1/1998 |
| EP | 0 788 940 A3 | 12/1999 |
| EP | 1 464 550 A1 | 10/2004 |
| EP | 1 527 964 A1 | 5/2005 |
| FR | 2 772 698 A1 | 6/1999 |
| JP | 8-225052 | 9/1996 |

* cited by examiner

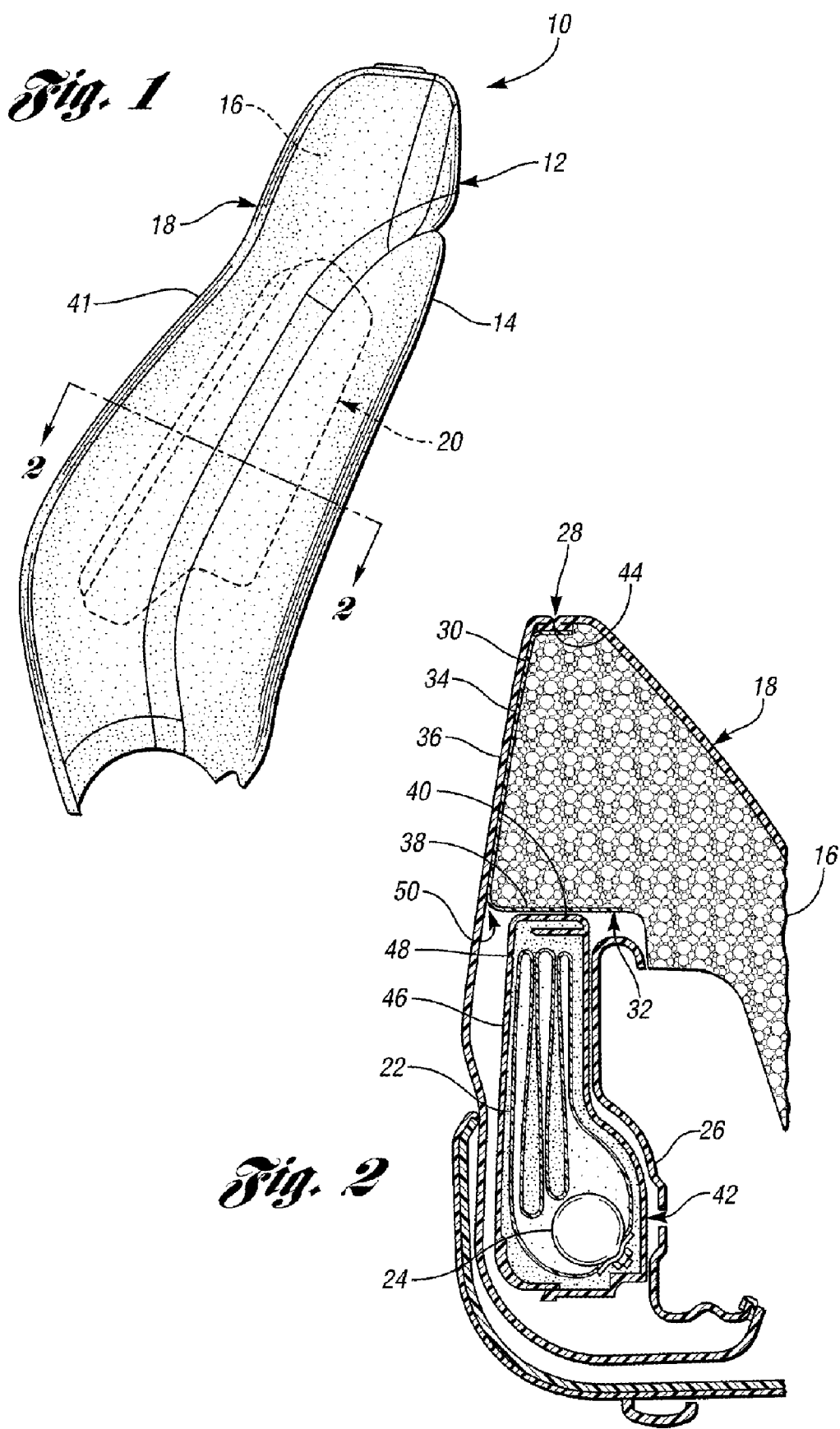

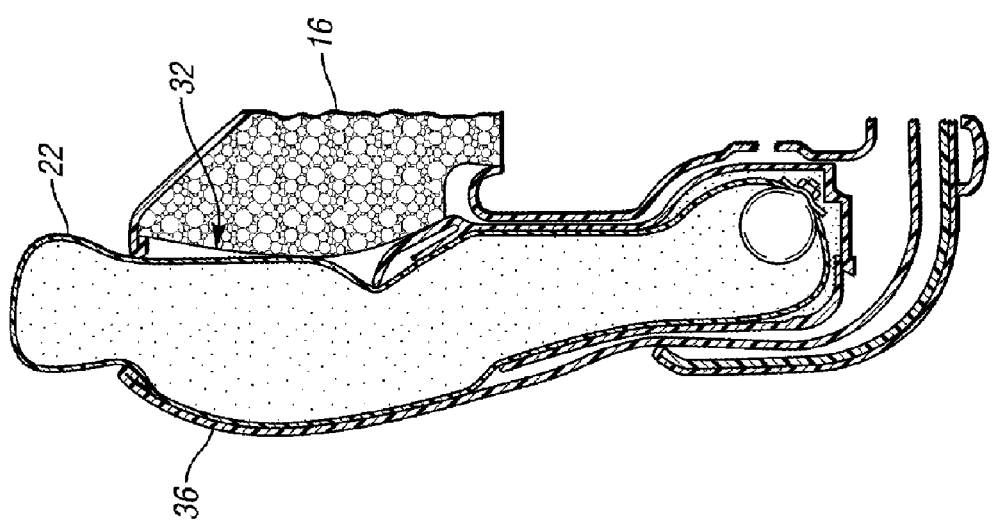
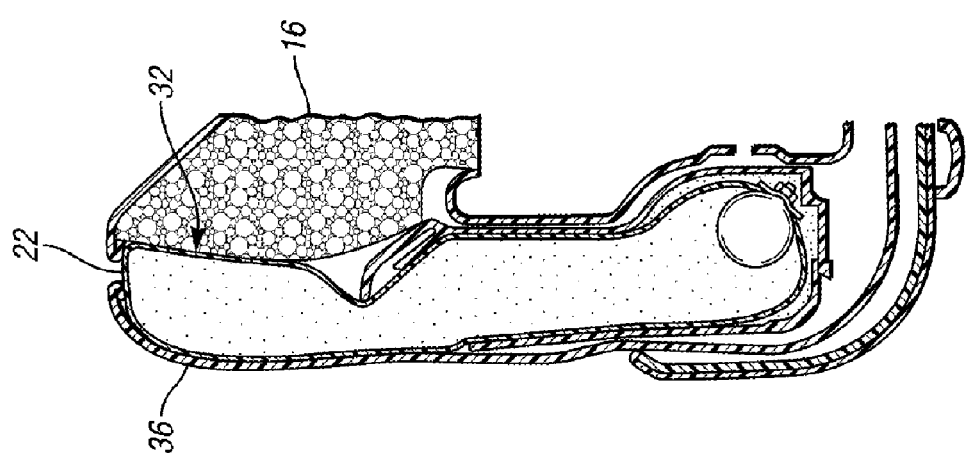
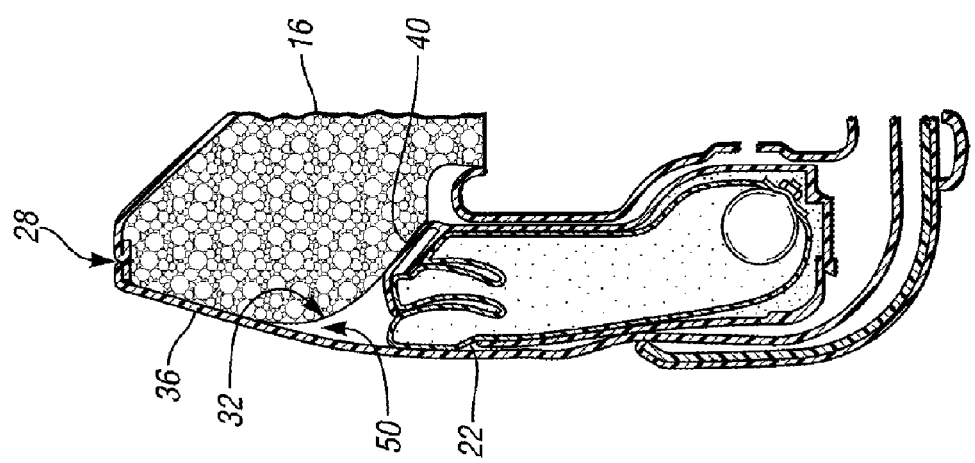

VEHICLE SEAT ASSEMBLY

BACKGROUND OF THE INVENTION

1. Field of the Invention

The present invention relates to a vehicle seat assembly, and in particular, a seat assembly including an airbag.

2. Background Art

Vehicles today are increasingly equipped with side airbags, which may be in the form of a side air curtain disposed in a headliner of the vehicle, or alternatively, may be an airbag disposed within a vehicle seat assembly. One limitation of airbags that are located within a seat assembly, is that the airbag needs to break through the seating material before it can fully deploy to protect a vehicle occupant. During deployment, such an airbag may encounter foam, or other seat pad materials, and must then break through a seat trim cover in order to escape from the seat assembly.

A number of attempts have been made to facilitate deployment of airbags from and through a vehicle seat assembly. One such device is described in U.S. Pat. No. 5,816,610 issued to Higashiura et al. on Oct. 6, 1998. Higashiura et al. describes a seat structure having a side impact airbag apparatus. A seat back pad of the seat structure may be made from foam, in which case the airbag apparatus is surrounded by a lining member. The lining member has a perforation to facilitate its breaking when the airbag deploys. The seat back itself is covered with a surface layer having a seam almost directly opposite the perforation in the lining member. In this way, the airbag deploys through the perforation in the lining member, breaks through the foam of the seat pad, and exits the seat structure through the seam in the surface layer. One limitation of the seat structure described in Higashiura et al., is that the airbag must deploy through the seat pad prior to exiting the seat structure. In particular, the airbag, which may be moving with very high velocity, impacts the foam seat pad as it exits the seat structure. This can cause pieces of the seat pad to be expelled from the seat as the airbag exits the seat cover. Therefore, a need exists for a seat assembly that includes protection for the seat pad from the deploying airbag.

SUMMARY OF THE INVENTION

Accordingly, the present invention provides a vehicle seat assembly including a seat pad, and a pad shield configured to protect the seat pad during deployment of an airbag from within the seat assembly.

The invention also provides a vehicle seat assembly including a frame for mounting the seat assembly to a vehicle. A seat pad is disposed proximate the frame, and a trim cover is disposed over the seat pad and includes a seam adjacent a side of the seat pad. The seat assembly also includes an airbag assembly, including an airbag and an inflator configured to supply gas to the airbag, thereby facilitating deployment of the airbag. A pad shield covers at least a portion of the seat pad for protecting the seat pad during deployment of the airbag. The pad shield includes a first portion disposed between the seat pad and a side of the trim cover such that a deployment path for the airbag is formed between the first portion of the pad shield and the side of the trim cover. This facilitates movement of the seat pad away from, and inhibits contact of the seat pad with, the deploying airbag. The deployment path facilitates deployment of the airbag through the seam in the trim cover.

The invention further provides a vehicle seat assembly including a frame for mounting the seat assembly to a vehicle. A seat pad is disposed proximate the frame, and a trim cover is disposed over the seat pad and includes a seam adjacent a side of the seat pad. The seat assembly also includes an airbag assembly, including an airbag and an inflator configured to supply gas to the airbag, thereby facilitating deployment of the airbag. A pad shield covers at least a portion of the seat pad for protecting the seat pad during deployment of the airbag. The pad shield cooperates with a side of the trim cover to form a deployment path for the airbag such that deployment of the airbag along the deployment path moves a portion of the seat pad away from the deploying airbag, while the pad shield inhibits contact between the seat pad and the deploying airbag. The orientation of the deployment path facilitates deployment of the airbag through the seam in the trim cover.

The invention also provides a vehicle seat assembly including a frame for mounting the seat assembly to a vehicle, and a seat pad proximate the frame. A trim cover is disposed over the seat pad, and includes a seam adjacent a side of the pad. An airbag assembly includes an airbag disposed at least partially within an airbag housing, and an inflator configured to supply gas to the airbag, thereby facilitating deployment of the airbag. A blocking member includes a first portion disposed between the seat pad and a side of the trim cover, thereby forming a deployment path for the airbag. The blocking member also includes a second portion disposed between the seat pad and a front of the airbag housing. The blocking member prohibits contact between the airbag and the seat pad during deployment of the airbag.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2; and FIGS. 3A-3C are fragmentary sectional views of the seat assembly shown in FIG. 1, illustrating deployment of an airbag as it exits the seat assembly.

DETAILED DESCRIPTION OF THE PREFERRED EMBODIMENT(S)

FIG. 1 shows a portion of a seat assembly 10 in accordance with the present invention. The seat assembly 10 includes a seat back 12, a back panel 14, and a seat pad 16 covered by a trim cover 18. The seat pad 16 is made from a molded polymeric material, such as a polyurethane foam. The use of a polymeric foam material to construct the seat pad 16 is cost effective and provides the flexibility needed to easily change the shape of the seat pad for different types of seat assemblies. Of course, other types of materials may be used to form a seat pad, such as the seat pad 16. Disposed within the seat back 12 is an airbag assembly 20. As shown in FIG. 2, the airbag assembly 20 includes an airbag 22 and an inflator 24, which is configured to supply gas to the airbag 22, thereby facilitating deployment of the airbag 22. Also shown in FIG. 2 is a portion of a seat frame 26 which can be used for mounting the seat assembly 10 to a vehicle. The seat pad 16 is disposed proximate the frame 26, and may be directly attached to the frame 26 at various points. The trim cover 18 includes a seam 28 which is adjacent to a side 30 of the seat pad 16. Covering at least a portion of the seat pad 16 is a pad shield 32. As explained more fully below, the pad shield 32 protects the seat pad 16 during deployment of the airbag 22.

The pad shield 32 acts as a blocking member to inhibit contact of the airbag 22 with the seat pad 16 when the airbag 22 is deploying. In the embodiment shown in FIG. 2, the pad shield 32 is effective to prohibit all contact between the deploying airbag 22 and the seat pad 16. As shown in FIG. 2, the pad shield 32 forms a generally L-shaped component having a first portion, or first leg 34, disposed between the seat pad 16 and a side 36 of the trim cover 18. The pad shield 32 also includes a second portion, or second leg 38, which is generally perpendicular to the first leg 34, and is disposed between the seat pad 16 and a front portion 40 of the airbag housing 42. The first portion 40 of the airbag housing 42 is generally oriented toward a front 41 of the seat assembly 10—see also FIG. 1. As explained in conjunction with FIGS. 3A-3C, the second leg 38 of the pad shield 32 helps to inhibit forward contact between the airbag 22 and the seat pad 16 as the airbag 22 deploys. As shown in FIG. 2, the pad shield 32 also includes a front portion 44 disposed between the seat pad 16 and the seam 28 of the trim cover 18. This additional portion 44 of the pad shield 32 further helps to ensure that there will be no contact between the seat pad 16 and the airbag 22 as it deploys.

The pad shield 32 may comprise any material or materials effective to inhibit contact between the airbag 22 and the seat pad 16 as the airbag 22 deploys. Thus, a pad shield, such as the pad shield 32, should be strong enough to resist tearing during airbag deployment, and yet flexible enough to allow a deploying airbag to move a seat pad out of the deployment path of the airbag. For example, a pad shield, such as the pad shield 32, may comprise a cloth material which includes natural fibers, synthetic fibers, or some combination thereof. One such material found to be effective for this purpose is a fleece material, which may already be in use in a seat assembly, such as the seat assembly 10. The fleece material can be attached to a seat pad, such as the seat pad 16, with an adhesive. Because fleece material may already be used in other parts of a seat assembly, the addition of a pad shield, such as the pad shield 32, manufactured from a fleece material, need not add significant cost to a seat assembly. Moreover, such a pad shield will provide an effective means for protecting a seat pad.

In some seat assemblies, a seat pad, such as the seat pad 16, will comprise a molded polymeric foam material. As noted above, the use of such material provides flexibility to easily change the shape of the seat pad for different types of seat assemblies. In addition, the use of a molded polymeric foam material allows a pad shield, such as the pad shield 32, to be molded in situ with the seat pad. In such cases, a pad shield may be made from a polymeric material. Molding a pad shield in situ with a seat pad provides the advantage of eliminating a post molding assembly operation. Moreover, molding a pad shield into a seat pad helps to ensure that the pad shield is accurately located within the seat pad.

Regardless of the type of material used to make the pad shield 32, the use of the pad shield 32 can reduce friction on the airbag 22 as it deploys. Although a polymer such as nylon may be particularly beneficial, even a fleece material will help reduce the friction on the airbag 22. This is because the pad shield 32 inhibits contact between the deploying airbag 22 and the seat pad 16. This helps to prevent energy loss from the airbag 22 by decreasing friction and protecting the seat pad 16 from damage. This, in turn, helps to reduce the deployment time for the airbag 22.

In the embodiment shown in FIG. 2, the airbag housing 42 includes a side portion 46 which is adjacent the side 36 of the trim cover 18. The side portion 46 of the airbag housing 42 includes a frangible portion 48 which is located so as to facilitate deployment of the airbag 22 along a deployment path 50. Also shown in FIG. 2, the pad shield 32 cooperates with the side 36 of the trim cover 18 to form the deployment path 50. As discussed below in conjunction with FIGS. 3A-3C, the deployment path 50 is oriented to facilitate deployment of the airbag 22 through the seam 28 in the trim cover 18. Although the airbag housing 42 comprises a relatively rigid material, in other embodiments, a thin sheet of material may be used in place of a rigid housing. In such embodiments, the sheet need not contain a frangible portion, as its properties will be such that it will tear as the airbag 22 deploys.

Turning to FIGS. 3A-3C, a sequence of the deployment of the airbag 22 is shown. In FIG. 3A, the airbag 22 has just started to deploy; this is characterized by the airbag 22 having breached the frangible portion 48 of the airbag housing 42. The front portion 40 of the airbag housing 42 pushes against the pad shield 32 as the airbag 22 begins to deploy. As noted above, the pad shield 32 and the side 36 of the trim cover 18 cooperate to form the deployment path 50. As the airbag 22 exits the airbag housing 42, it moves down the deployment path 50.

In FIG. 3B, the airbag 22 has moved substantially down the deployment path 50, making its way between the side 36 of the trim cover 18 and the pad shield 32. As the airbag 22 moves down the deployment path 50, it pushes against the pad shield 32 which inhibits contact between the airbag 22 and the seat pad 16. As the pad shield 32 is displaced by the deploying airbag 22, the seat pad 16 is moved safely to one side, and no direct contact occurs between the seat pad 16 and the airbag 22. Because of the presence of the pad shield 32, friction on the airbag 22 is reduced, as is its deployment time. At the end of the deployment path 50, the airbag 22 reaches the seam 28 in the trim cover 18, which then separates under the force of the deploying airbag 22.

In FIG. 3C, the airbag 22 has traversed the seam 28 in the trim cover 18, and is now expanding outside the seat assembly 10 to provide protection for a seated occupant. As shown in FIG. 3C, the side 36 of the trim cover 18 undergoes some deflection as the airbag 22 exits the seat assembly 10. This deflection does not impede deployment of the airbag 22, as the general direction of the airbag 22 during deployment is along the deployment path 50, and thus, most of the energy of the airbag 22 is directed toward the seam 28 in the trim cover 18. As shown in FIGS. 3A-3C, as the airbag 22 deploys, the seat pad 16 remains fully in tact, being moved safely aside as the airbag 22 contacts the pad shield 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
    a frame for mounting the seat assembly to a vehicle;
    a seat pad proximate the frame;
    a trim cover disposed over the seat pad and including a seam adjacent a side of the seat pad;
    an airbag assembly, including an airbag and an inflator configured to supply gas to the airbag, thereby facilitating deployment of the airbag, the airbag assembly further including a housing at least partially surrounding the airbag prior to the deployment of the airbag, the housing including a front generally oriented toward a front of the seat assembly, and a side adjacent a side of the trim cover, the side of the housing including a frangible portion disposed to facilitate deployment of the airbag along a deployment path; and a pad shield covering at least a portion of the seat pad and including a first portion sandwiched between the seat pad and the side of the trim cover such that the deployment path for the airbag is formed between the first portion of the pad shield and the side of the trim cover.

2. The vehicle seat assembly of claim 1, wherein the pad shield includes a cloth material attached to at least a portion of the seat pad with an adhesive.

3. The vehicle seat assembly of claim 1, wherein the seat pad includes a polymeric foam material.

4. The vehicle seat assembly of claim 3, wherein the pad shield includes a polymeric material that is molded in place with the seat pad, thereby allowing the seat pad to naturally adhere to the pad shield and facilitating accurate location of the pad shield relative to the seat pad.

5. The vehicle seat assembly of claim 1, wherein the pad shield installed in the vehicle seat assembly prior to the deployment of the airbag forms a generally L-shaped component such that the pad shield includes a second portion generally perpendicular to the first portion of the pad shield and across the front of the airbag housing for inhibiting forward contact between the deploying airbag and the seat pad.

6. A vehicle seat assembly, comprising:

a frame for mounting the seat assembly to a vehicle;

a seat pad proximate the frame;

a trim cover disposed over the seat pad and including a seam adjacent a side of the seat pad;

an airbag assembly, including an airbag and an inflator configured to supply gas to the airbag, thereby facilitating deployment of the airbag, the airbag assembly further including a housing at least partially surrounding the airbag prior to the deployment of the airbag, the housing including a front generally oriented toward a front of the seat assembly, and a side adjacent a side of the trim cover, the side of the housing including a frangible portion disposed to facilitate deployment of the airbag along a deployment path; and a pad shield covering at least a portion of the seat pad for protecting the seat pad during the deployment of the airbag, the pad shield including a first portion sandwiched between the seat pad and the side of the trim cover to form the deployment path for the airbag such that deployment of the airbag along the deployment path moves a portion of the seat pad away from the deploying airbag, while the pad shield inhibits contact between the seat pad and the deploying airbag, the orientation of the deployment path facilitating deployment of the airbag through the seam in the trim cover.

7. The vehicle seat assembly of claim 6, wherein the pad shield includes a cloth material attached to at least a portion of the seat pad with an adhesive.

8. The vehicle of claim 6, wherein the seat pad includes a polymeric foam material.

9. The vehicle seat assembly of claim 8, wherein the pad shield includes a polymeric material that is molded in place with the seat pad, thereby allowing the seat pad to naturally adhere to the pad shield and facilitating accurate location of the pad shield relative to the seat pad.

10. The vehicle seat assembly of claim 6, wherein the pad shield installed in the vehicle seat assembly prior to the deployment of the airbag forms a generally L-shaped component such that the pad shield includes a second portion generally perpendicular to the first portion of the pad shield and across the front of the airbag housing for inhibiting forward contact between the deploying airbag and the seat pad.

11. A vehicle seat assembly, comprising:

a frame for mounting the seat assembly to a vehicle;

a seat pad proximate the frame;

a trim cover disposed over the seat pad and including a seam adjacent a side of the seat pad;

an airbag assembly, including an airbag disposed at least partially within an airbag housing, and an inflator configured to supply gas to the airbag, thereby facilitating deployment of the airbag; and a blocking member including a first portion sandwiched between the seat pad and a side of the trim cover forming a deployment path for the airbag, and a second portion disposed between the seat pad and a front of the airbag housing, the blocking member prohibiting contact between the airbag and the seat pad during deployment of the airbag, the blocking member being a unitary structure, and the first and second portions of the blocking member forming a generally L-shaped component.

12. The vehicle seat assembly of claim 11, wherein the first portion of the blocking member defines one side of a deployment path for the airbag and the side of the trim cover defines another side of the deployment path, the orientation of the deployment path facilitating deployment of the airbag through the seam in the trim cover.

13. The vehicle seat assembly of claim 11, wherein the blocking member includes a cloth material attached to at least a portion of the seat pad with an adhesive.

14. The vehicle of claim 11, wherein the blocking member includes a polymeric material.

15. The vehicle seat assembly of claim 14, wherein the blocking member includes a polymeric material that is molded in place with the seat pad, thereby allowing the seat pad to naturally adhere to the blocking member and facilitating accurate location of the blocking member relative to the seat pad.

16. The vehicle seat assembly of claim 11, wherein the airbag housing includes a side adjacent the side of the trim cover, the side of the airbag housing including a frangible portion disposed to facilitate deployment of the airbag along the deployment path.

* * * * *